(12) United States Patent
Nace et al.

(10) Patent No.: US 9,438,079 B2
(45) Date of Patent: Sep. 6, 2016

(54) ARMATURE END INSULATOR FOR A POWER TOOL MOTOR

(71) Applicant: Black & Decker Inc., Newark, DE (US)

(72) Inventors: Daniel F. Nace, Towson, MD (US); Michael Marjomaa, Red Lion, PA (US)

(73) Assignee: BLACK & DECKER INC., New Britain, CT (US)

( * ) Notice: Subject to any disclaimer, the term of this patent is extended or adjusted under 35 U.S.C. 154(b) by 164 days.

(21) Appl. No.: 13/899,956

(22) Filed: May 22, 2013

(65) Prior Publication Data

US 2013/0313940 A1     Nov. 28, 2013

Related U.S. Application Data

(60) Provisional application No. 61/650,622, filed on May 23, 2012.

(51) Int. Cl.
| H02K 3/34 | (2006.01) |
|---|---|
| H02K 3/38 | (2006.01) |
| H02K 9/06 | (2006.01) |
| H02K 5/14 | (2006.01) |

(52) U.S. Cl.
CPC .............. *H02K 3/345* (2013.01); *H02K 3/38* (2013.01); *H02K 9/06* (2013.01); *H02K 5/148* (2013.01)

(58) Field of Classification Search
CPC .......... H02K 3/345; H02K 3/38; H02K 3/34; H02K 1/30
USPC ................................................ 310/194, 195
See application file for complete search history.

(56) References Cited

U.S. PATENT DOCUMENTS

| 3,095,515 | A | * | 6/1963 | Case et al. ................. 310/43 |
| 3,831,268 | A | * | 8/1974 | Boyd et al. ................. 29/598 |
| 3,882,336 | A | | 5/1975 | Boyd |
| 3,917,967 | A | | 11/1975 | Robison |
| 4,028,573 | A | | 6/1977 | Terrone |
| 4,161,669 | A | | 7/1979 | Aimar |
| 4,340,829 | A | | 7/1982 | McCoy |
| 4,563,606 | A | | 1/1986 | Fukasawa |
| 4,631,433 | A | | 12/1986 | Stokes |
| 4,642,886 | A | | 2/1987 | Muck |
| 4,663,835 | A | * | 5/1987 | Caillier, Sr. ................. 29/598 |

(Continued)

FOREIGN PATENT DOCUMENTS

| CH | 409104 A | 3/1966 |
| DE | 1797835 U | 10/1959 |

(Continued)

*Primary Examiner* — Thomas Truong
(74) *Attorney, Agent, or Firm* — Amir R. Rohani (57) ABSTRACT

An electric motor is provided including a stator and an armature received within the stator for rotational movement within the stator. The armature includes an armature shaft on which a commutator is mounted, and a lamination stack also mounted on the armature shaft and having radially extending teeth. The armature includes an end insulator arranged at an end of the lamination stack, the end insulator having a base portion fitted around the armature shaft and insulating teeth corresponding to the radially extending teeth of the lamination stack. A set of coils are wound in the lamination stack slots and the end insulator slots. At least a portion of the insulating teeth has a greater thickness than at least a portion of the base portion. Alternatively, at least one of the insulating teeth has a greater thickness than at least another of the insulating teeth.

6 Claims, 8 Drawing Sheets

(56) References Cited

U.S. PATENT DOCUMENTS

| | | |
|---|---|---|
| 4,825,114 A | 4/1989 | Ohtsuka |
| 4,904,893 A | 2/1990 | Snider |
| 5,144,182 A | 9/1992 | Lemmer |
| 5,304,885 A * | 4/1994 | Wong et al. ........... 310/216.115 |
| 5,428,258 A | 6/1995 | Mowery |
| 5,449,963 A * | 9/1995 | Mok ............................. 310/270 |
| 5,639,044 A | 6/1997 | Cardini |
| 5,717,273 A | 2/1998 | Gulbrandson |
| 5,828,152 A | 10/1998 | Takeda |
| 6,006,418 A | 12/1999 | Takeda |
| 6,580,193 B2 | 6/2003 | Yoshikawa |
| 6,590,310 B2 | 7/2003 | Takano |
| 6,633,102 B2 * | 10/2003 | Nagai et al. .................. 310/215 |
| 6,670,736 B2 | 12/2003 | Horng |
| 6,685,126 B2 | 2/2004 | Takano |
| 6,685,127 B2 | 2/2004 | Takano |
| 6,722,604 B2 | 4/2004 | Takano |
| 6,741,009 B1 | 5/2004 | Ariyoshi |
| 6,745,972 B2 | 6/2004 | Takano |
| 6,831,386 B2 | 12/2004 | Miya |
| 6,831,389 B2 | 12/2004 | Takano |
| 6,838,804 B2 | 1/2005 | Mimura |
| 6,992,417 B1 | 1/2006 | Yamada |
| 7,126,242 B2 | 10/2006 | Williams |
| 7,200,917 B2 | 4/2007 | Takano |
| 7,213,324 B2 | 5/2007 | Takano |
| 7,242,125 B2 | 7/2007 | Schneider |
| 7,256,525 B2 | 8/2007 | Aoki |
| 7,268,457 B2 | 9/2007 | Noda |
| 7,362,028 B2 | 4/2008 | Lee |
| 7,876,015 B2 | 1/2011 | Sakata |
| 7,893,568 B2 | 2/2011 | Huang |
| 8,076,818 B2 | 12/2011 | Sugishima |
| 8,076,819 B2 | 12/2011 | Taema |
| 2003/0048023 A1 * | 3/2003 | Nagai et al. .................. 310/215 |
| 2004/0155550 A1 | 8/2004 | Yamamoto |
| 2006/0012261 A1 | 1/2006 | Ku |
| 2006/0022551 A1 | 2/2006 | Ku |
| 2008/0079101 A1 | 4/2008 | Ai |
| 2009/0324435 A1 | 12/2009 | Sears |
| 2011/0243768 A1 | 10/2011 | Taema |
| 2012/0086299 A1 | 4/2012 | Hsu |
| 2012/0169173 A1 | 7/2012 | Jang |
| 2013/0099604 A1 | 4/2013 | Yu |

FOREIGN PATENT DOCUMENTS

| | | |
|---|---|---|
| DE | 3216117 A1 | 11/1983 |
| DE | 19533029 C2 | 3/1996 |
| DE | 10335559 A1 | 3/2005 |
| DE | 102006034120 A1 | 1/2008 |
| EP | 1292003 A1 | 3/2003 |
| EP | 1294077 A2 | 3/2003 |
| EP | 1575147 B1 | 9/2005 |
| EP | 1764898 A1 | 3/2007 |
| FR | 1023026 A | 3/1953 |
| FR | 2328318 A1 | 5/1977 |
| FR | 2778283 A1 | 11/1999 |
| JP | 62233046 A2 | 10/1987 |
| JP | 2001286085 A | 10/2001 |
| JP | 2008253027 A | 10/2008 |
| JP | 2009065723 A | 3/2009 |
| JP | 2009240133 A | 10/2009 |
| KR | 1020050046359 A | 11/2003 |
| WO | 2006025105 A1 | 3/2006 |

* cited by examiner

ARMATURE END INSULATOR FOR A POWER TOOL MOTOR

CROSS REFERENCE TO RELATED APPLICATION

This utility application claims the benefit of U.S. Provisional Application No. 61/650,622 filed May 23, 2012.

FIELD OF THE INVENTION

The present invention relates to power tools, and more particularly to an end insulator for an armature lamination stack of a motor in a power tool.

BACKGROUND AND SUMMARY

Electric motors are used in a variety of applications, including power tools. Electric motors may be brushed or brushless. In a typical brushed motor, the motor includes a motor armature coupled to a commutator assembly and a shaft, and a stator assembly that may include permanent magnets attached to the inner circumference of the stator. Two brushes may be provided in contact with the commutator assembly to drive the motor armature. The commutator is fixed for rotation with the motor shaft and provides an electrical connection between the rotating armature and the stationary brushes. Electrical leads selectively link the brushes to a power source. For a more detailed description of electric motors and power tools utilizing such motors, reference is made to U.S. Pat. No. 7,126,242 issued Oct. 24, 2006, and U.S. Pat. No. 7,893,586 issued Feb. 22, 2011, both of which are assigned to Black & Decker Inc, and both of which are incorporated herein by reference in their entireties.

Figure 1:
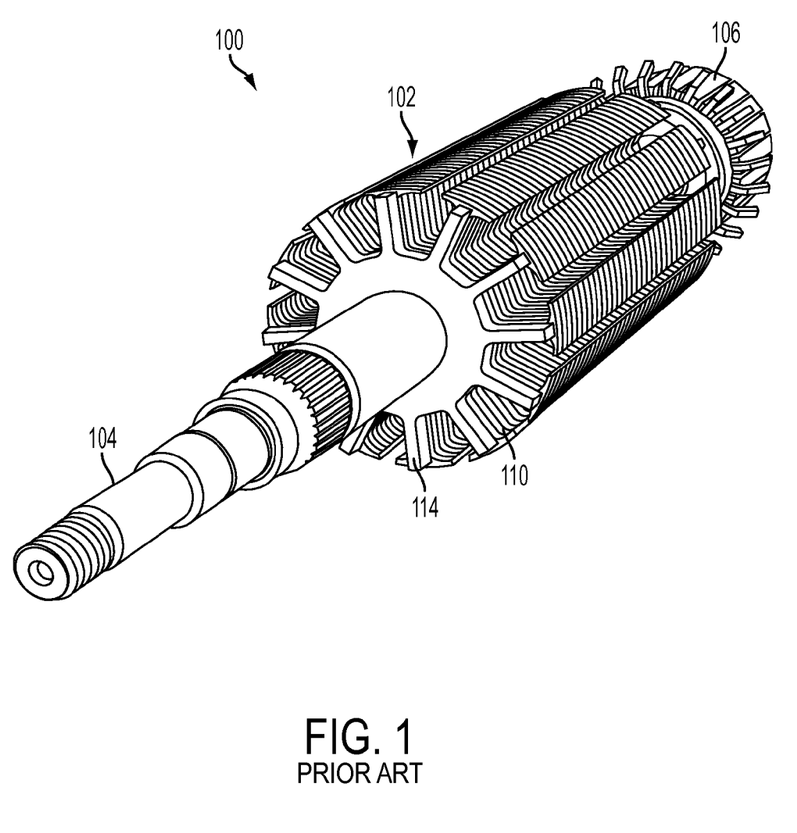
FIG. 1 illustrates a perspective view of an armature assembly including a conventional end insulator.
Figure 2:
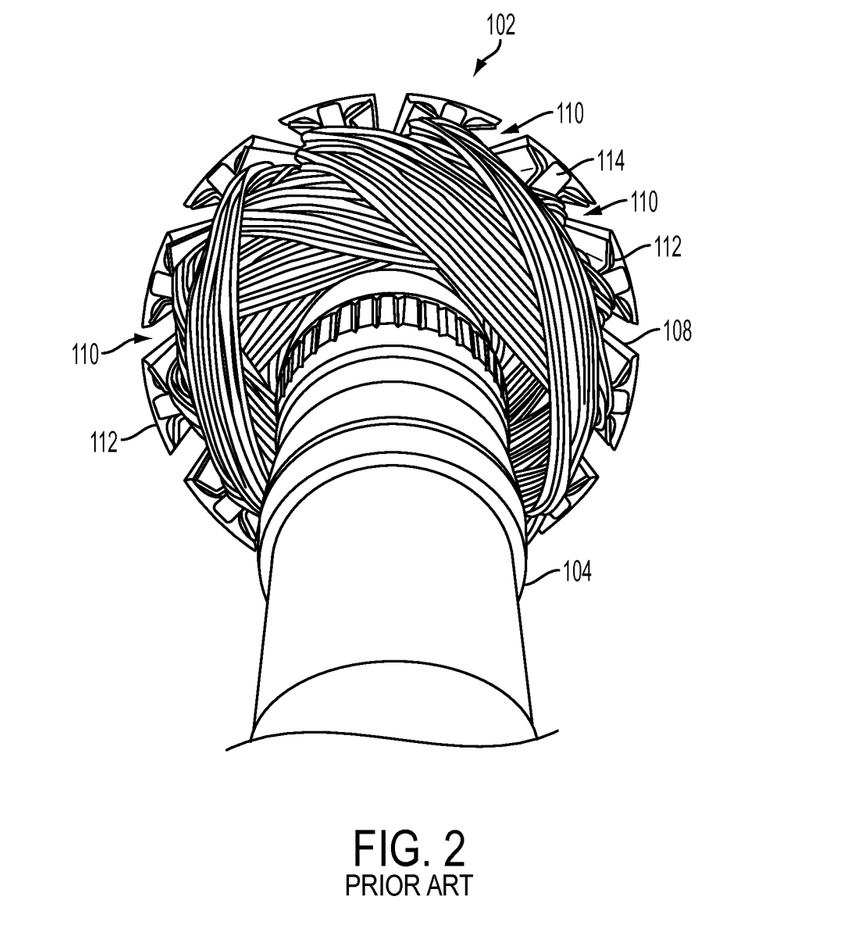
FIG. 2 illustrates an end view of a fully wound armature assembly including the conventional end insulator of FIG. 1.

FIG. 1 depicts a perspective view of a rotor assembly 100 including a motor armature 102 affixed to the motor shaft 104 for rotation with a commutator 106. The motor armature 102 may, for example, include a lamination stack that forms a series of peripheral slots 110. FIG. 2 depicts a cross-sectional view of the same rotor assembly 100 with a series of insulated conductive wires 108 wound in the armature slots 110 to form armature coils. A layer of insulating material (e.g., insulating paper) 112 is disposed within each lamination slot 110 to insulate the lamination slot 110 from the conducting wires 108. Ends of the wires are fused to segments of the commutator 106. Commutator 106 may, by way of example, include 24 independent segments.

An armature end insulator 114, commonly referred to as a stack insulation, end fiber or end spider, is provided at one or both ends of the armature lamination stack 102 in order to provide some separation between the lamination stack 102 and the conductive wires 108. The UL standards as relate to power tool industry safety features require a lamination stack end insulation of approximately 2 mm, although end insulation of 2.5 mm is common to account for material and process tolerances. Once the winding process is complete, a wedge (not shown) is inserted into the peripheral slots above the windings to shield the windings from dust and debris.

Winding the armature is typically performed in several stages, where a first round of coils is sequentially wound into the peripheral slots 110 followed by another, and this process is repeated until the slots 110 are filled to a desired level. A challenge in winding the armature is that it is difficult to position the wire coils within the peripheral slots in an efficient and compact manner to obtain the maximum amount of wire within each slot fill. Therefore, a mechanism to pack in the most amount of conductive wire into the slots is desirable.

According to an embodiment of the invention, an electric motor is provided including a stator and an armature received within the stator for rotational movement within the stator. In an embodiment, the armature includes an armature shaft on which a commutator is mounted, and a lamination stack also mounted on the armature shaft and having radially extending teeth that form slots therebetween. The slots are arranged circumferentially around a periphery of the lamination stack. The armature further includes end insulator arranged at an end of the lamination stack, the end insulator having a base portion fitted around the armature shaft and insulating teeth corresponding to the radially extending teeth of the lamination stack that form slots therebetween. In an embodiment, at least a portion of the insulating teeth has a greater thickness than at least a portion of the base portion. A set of coils are wound in the lamination stack slots and the end insulator slots. The shape of the end insulator according to this embodiment guides the coils to be wound more compactly in the lamination stack slots, as will be discussed in detail later.

According to an embodiment, the end insulator comprises an inner substantially flat surface mounted on the end of the lamination stack and an outer uneven surface formed by a flat surface of the base portion and at least one sloped surface of the insulating teeth. In an embodiment, each insulating tooth comprises a first extension surface extending from an outer surface of the base portion at a first angle. Each insulating tooth may further include a second extension surface extending from the first extension surface at a second angle. The second extension surface may be arranged at an angle of 0 to 10 degrees with respect to the outer surface of the base portion. In an embodiment, the base portion has a thickness of approximately 1-3 mm and the insulating teeth have various thickness levels between approximately 2 to 5 mm. In an embodiment, wherein each insulating tooth comprises two walls extending longitudinally and substantially in parallel from the inner surface of the end insulator to the outer surface thereof, said walls defining said plurality of slots of the end insulator. In an embodiment, each insulating tooth further includes a support rib corresponding to ribs at the ends of radially extending teeth of the lamination stack, the insulating teeth extending from the inner surface of the end insulator to the outer surface thereof.

According to an alternative embodiment of the invention, an electric motor is provided including a stator and an armature received within the stator for rotational movement within the stator. The armature includes an armature shaft on which a commutator is mounted, and a lamination stack also mounted on the armature shaft and having radially extending teeth that form slots therebetween. The slots are arranged circumferentially around a periphery of the lamination stack. In an embodiment, the armature further includes end insulator arranged at an end of the lamination stack, the end insulator having a base portion fitted around the armature shaft and insulating teeth corresponding to the radially extending teeth of the lamination stack that form slots therebetween. In an embodiment, at least one of the insulating teeth has a greater thickness than at least another of the insulating teeth. A set of coils are wound in the lamination stack slots and the end insulator slots.

In an embodiment, at least two of the insulating teeth that are arranged opposite one another have the same thickness as the base portion. In an embodiment, thicknesses of a subset of the insulating teeth gradually increase around the end insulator. In an embodiment, the base layer includes a main portion arranged along a first plane and two stepped surfaces arranged opposite one another along a second plane parallel to the first plane, and at least two of the teeth extend from the stepped surfaces. In an embodiment, the two stepped surfaces comprise a plurality of stepped sub-surfaces, and at least two of the plurality of teeth extend from each of the sub-surfaces. In an embodiment, the coils are wound in the slots adjacent the insulating teeth with the smallest thickness followed by slots adjacent to gradually thicker insulating teeth.

According to yet another embodiment of the invention, an electric motor is provided including a stator and an armature received within the stator for rotational movement within the stator. The armature includes an armature shaft on which a commutator is mounted, and a lamination stack also mounted on the armature shaft and having radially extending teeth that form slots therebetween. The slots are arranged circumferentially around a periphery of the lamination stack. The armature further includes end insulator arranged at an end of the lamination stack, the end insulator having a base portion fitted around the armature shaft and insulating teeth corresponding to the radially extending teeth of the lamination stack that form slots therebetween. In an embodiment, the end insulator has a uniform thickness of at least 5 mm. A set of coils are wound in the lamination stack slots and the end insulator slots.

The drawings described herein are for illustrative purposes only of selected embodiments and not all possible implementations, and are not intended to limit the scope of the present disclosure. Corresponding reference numerals indicate corresponding parts throughout the several views of the drawings.

DESCRIPTION

According to embodiments of the invention discussed herein, improved configurations of armature end insulator are provided to improve the winding process of the armature conductive wires and obtain better slot fill. According to these embodiments, the improved end insulators help route the wires more compactly inside the armature lamination stack slots.

Figure 3:
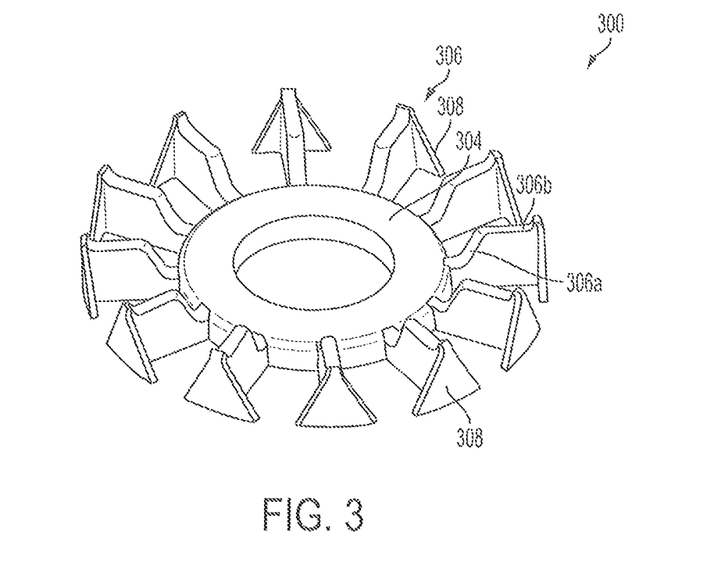
FIG. 3 illustrates a perspective view of an end insulator, according to a first embodiment of the invention.

FIG. 3 depicts a stack end insulator 300 (also referred to as end fiber or end spider) for attachment to an end of a motor armature lamination stack, according to an embodiment of the invention. The end insulator 300 may be made of, for example, plastic or any other insulating material, made via injection-molding or any other known process for obtaining the desired shaped discussed below.

The end insulator 300 in this embodiment includes a flat base portion 304 and several insulating teeth 306 extending around a circumference of the base portion 304. The insulating teeth 306 have the same cross-sectional profile as corresponding peripheral teeth of the lamination stack. An inner surface of the insulating teeth 306 and a bottom surface of the base portion 304 are arranged along a single flat plane for attachment to an end portion of the armature lamination stack. The base portion 304 is ring-shaped and has a thickness of approximately 2-3 mm. An outer surface of the base portion 304 is flat in this embodiment, although it is envisioned that a sloped outer surface angled towards the center of the ring is within the scope of this disclosure. Outer surfaces of the insulating teeth 306 protrude outwardly from the outer surface of the base portion 304 at stepped thickness levels. The insulating teeth 306 in this embodiment may thus be referred to as "stepped teeth." In an embodiment, the outer edge (i.e., outer surface) of each insulating tooth 306 includes a first extension surface 306a extending from the outer surface of the base portion 304 at a first angle (e.g., approximately 30-60 degrees with respect to the plane of the outer surface of the base portion 304) and a second extension surface 306b extending from the first extension surface 306a at a second angle (e.g., 0 to 10 degrees with respect to the plane of the outer surface of the base portion 304). In an embodiment, the insulating teeth 306 may have a varying thickness of between approximately 2 to 5 mm and more. In an embodiment, the outer walls of the insulating teeth 306 are arranged substantially in parallel.

Figure 4:
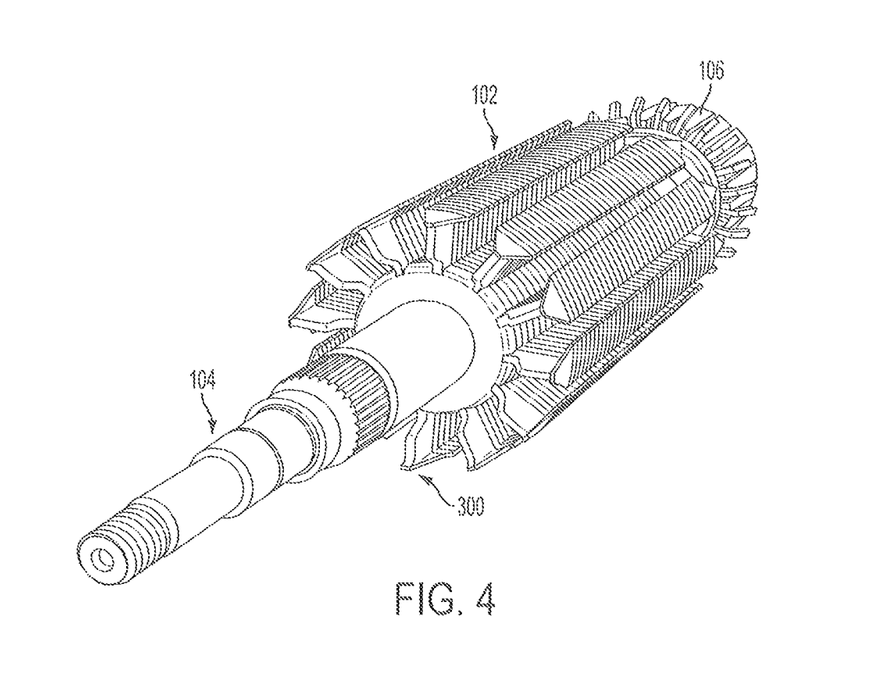
FIG. 4 illustrates a perspective view of an armature assembly including the end insulator of FIG. 3, according to an embodiment of the invention.

FIG. 4 depicts the arrangement of the end insulator 300 with respect to the armature lamination stack 102, according to an embodiment of the invention. As can be seen herein, a cross-sectional profile of the end insulator 300 matches the profile of the lamination stack. In other words, the insulating teeth 306 have slots therebetween that match the slots of the armature lamination stack 102. When attached, the slots of the end insulator 300 line up with the peripheral slots of the armature lamination stack. The end insulator 300 may be provided at one or both ends of the armature lamination stack 102.

In an embodiment, as shown in FIGS. 3 and 4, each insulating tooth 306 may further include a support rib 308 extending from the bottom surface of the insulating teeth 306 to the end of the second edge 306b. The bottom sides of the support ribs 308 rest on corresponding ribs of the lamination stack teeth above the peripheral slots. The support rib 308 may be V-shaped in a longitudinal direction of the lamination stack 102, with its width narrowing as it projects away from the lamination stack 102.

As previously discussed, lamination stack insulating paper (112 in FIG. 2) is inserted inside the lamination stack slots before winding the coils in order to provide double-insulation between the lamination stack 102 and the conductive wires 108, and the ribs of the lamination stack teeth are provided on the outer periphery of the lamination stack 102 to partially enclose the lamination stack slots 110, thus keeping the insulating paper inside the slots. The support ribs 308 have the same cross-sectional profile as the ribs of the lamination stack slots 110. The support ribs 308 also provide further support for the insulating teeth 306 against the lamination stack to prevent the teeth 306 from bending or breaking. In one embodiment, the lamination stack insulating paper may be extended slightly (e.g., 0.5 to 1 mm) from the ends of the lamination stack slots to allow for proper alignment of the support ribs 308 of the end insulator 300 with the lamination stack slots.

FIGS. 5A-10B depict the winding steps of armature coils 310 on an armature using the end insulator 300 of FIGS. 3 and 4 discussed above, shown step by step in FIGS. 5A, 6A, 7A, 8A, 9A, and 10A, compared to winding of armature coils 108 on an armature using the conventional flat end insulator 114 of FIG. 1, shown step by step in FIGS. 5B, 6B, 7B, 8B, 9B, and 10B. It must be noted that the same size conductive wires and the same number of turns per winding step are used for these two armatures.

Figure 5A:
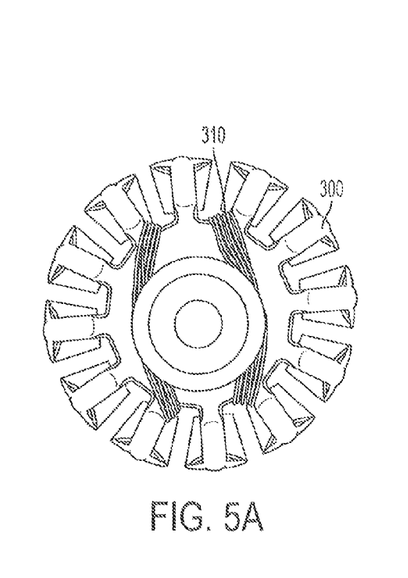
FIGS. 5A and 5B illustrate end views of armatures having the end insulator of FIG. 3 and a conventional end insulator, respectively, each with a first pair of coil windings, according to an embodiment.
Figure 5B:
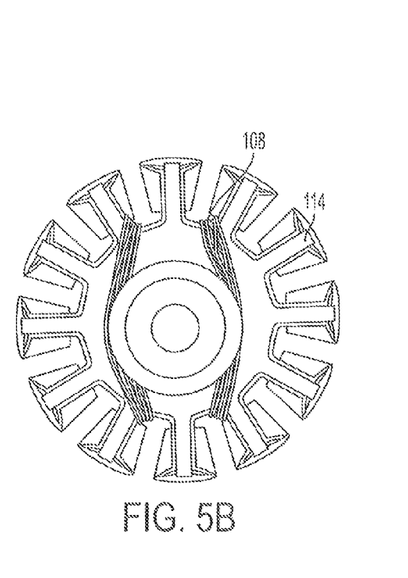
Figure 6A:
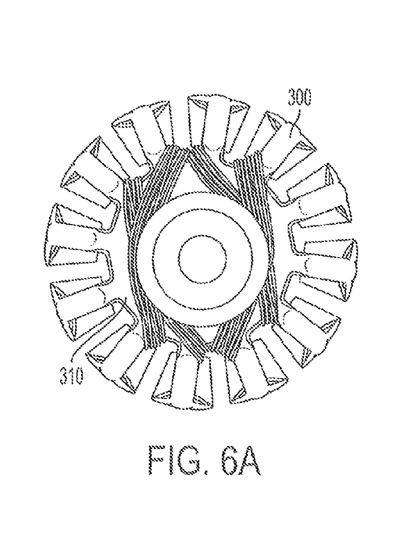
FIGS. 6A and 6B illustrate the same armatures as FIGS. 5A and 5B, respectively, each with a second pair of coil windings, according to an embodiment.
Figure 6B:
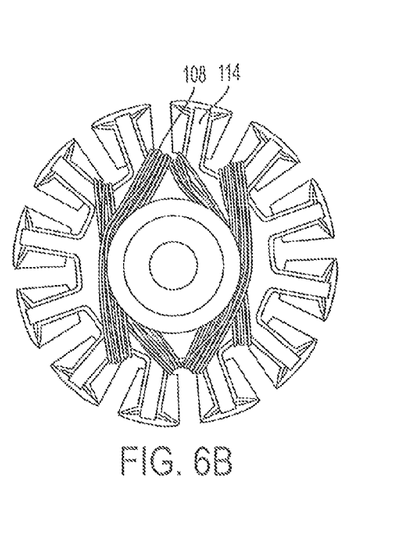
Figure 7A:
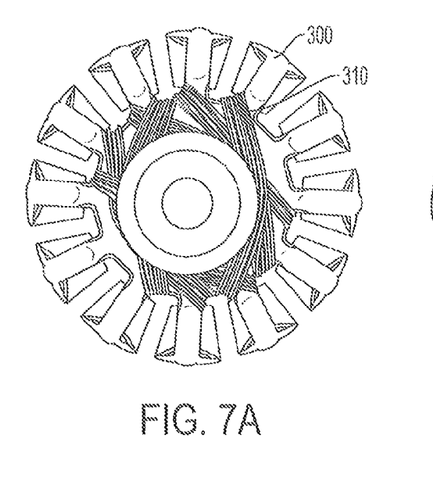
FIGS. 7A and 7B illustrate the same armatures as FIGS. 5A and 5B, respectively, each with a third pair of coil windings, according to an embodiment.
Figure 7B:
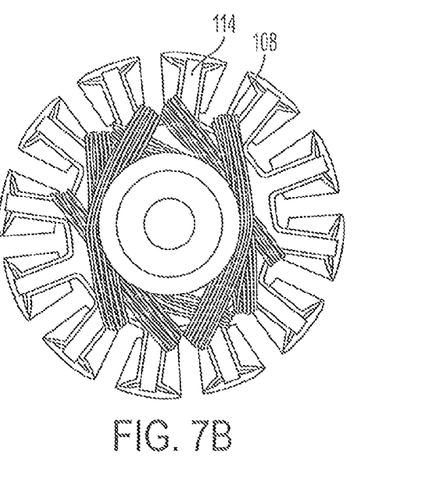
Figure 8A:
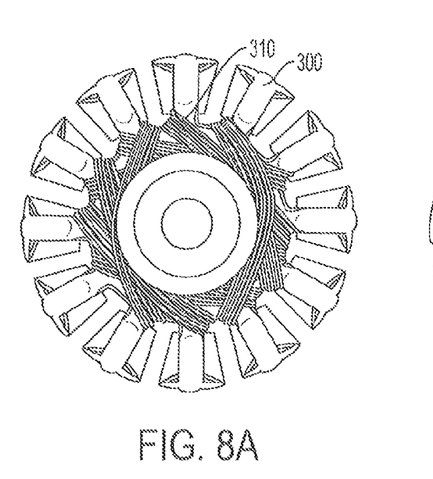
FIGS. 8A and 8B illustrate the same armatures as FIGS. 5A and 5B, respectively, each with a fourth pair of coil windings, according to an embodiment.
Figure 8B:
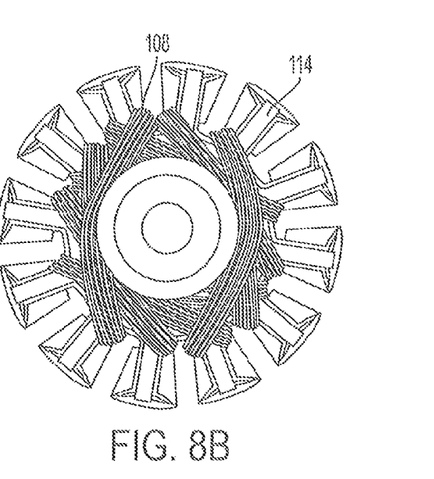

FIGS. 5A and 5B depict the competed winding of a first pair of coils at eight turns per coil. FIGS. 6A and 6B depict the completed winding of a second pair of coils at sixteen turns per coil. As can be seen in FIG. 6A, the first extension surface 306a of the end insulator 300 is already beginning to guide the coil winding closer to the lamination stack core. FIGS. 7A and 7B depict the completed winding of a third pair of coils at sixteen turns per coil. FIGS. 8A and 8B depict the completed winding of a fourth pair of coils at sixteen turns per coil.

Figure 9A:
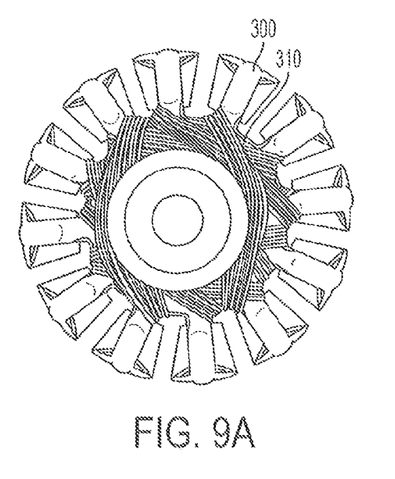
FIGS. 9A and 9B illustrate the same armatures as FIGS. 5A and 5B, respectively, each with a fifth pair of coil windings, according to an embodiment.
Figure 9B:
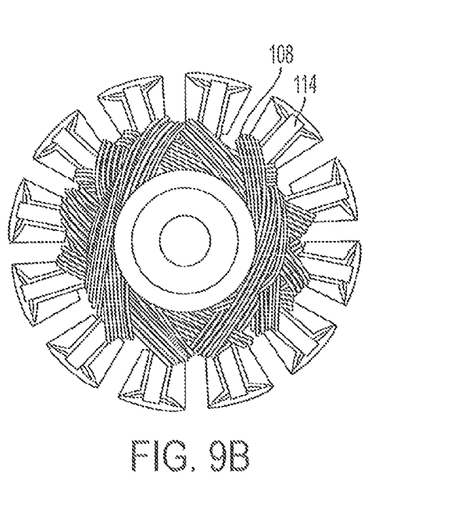

FIGS. 9A and 9B depict the completed winding of a fifth pair of coils at sixteen turns per coil. By the end of the fifth pair winding, it is clear that the wires 310 in FIG. 9A are wound closer to the core of the lamination stack than wires 108 in FIG. 9B, as the extension surface 306a forces the wires 310 towards the base portion 304 of the end insulator 300.

Figure 10A:
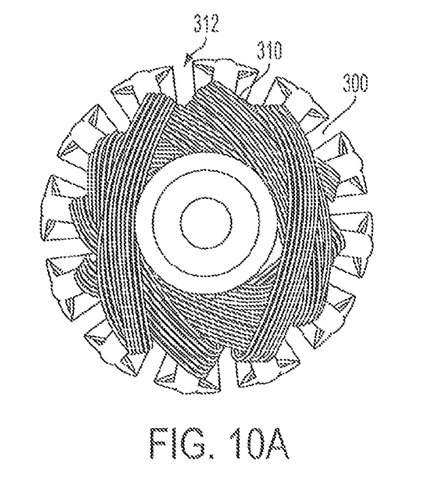
FIGS. 10A and 10B illustrate the same armatures as FIGS. 5A and 5B, respectively, each fully wound, according to an embodiment.
Figure 10B:
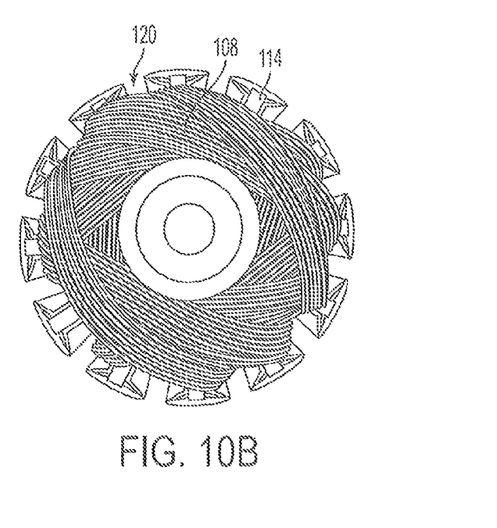

FIGS. 10A and 10B depict the completed windings after several additional winding steps, clearly showing bigger gaps 312 within the laminations stack slots of FIG. 10A above the windings 310 than the gaps 120 within the lamination stack slots of FIG. 10B above the windings 108. It was found that, given the same amount and size of conductive wire, winding the wires over the end insulator 300 reduces the total amount of space occupied by the coil wires by approximately 15%. This allow for a wider gap on top of the slots, which can accommodate insertion of thicker and stronger wedges into the armature slots. Alternatively, the more compact winding of the coils according to this embodiment enables using either thicker coil wires or more number of coil windings, which would increase armature performance.

Figure 11:
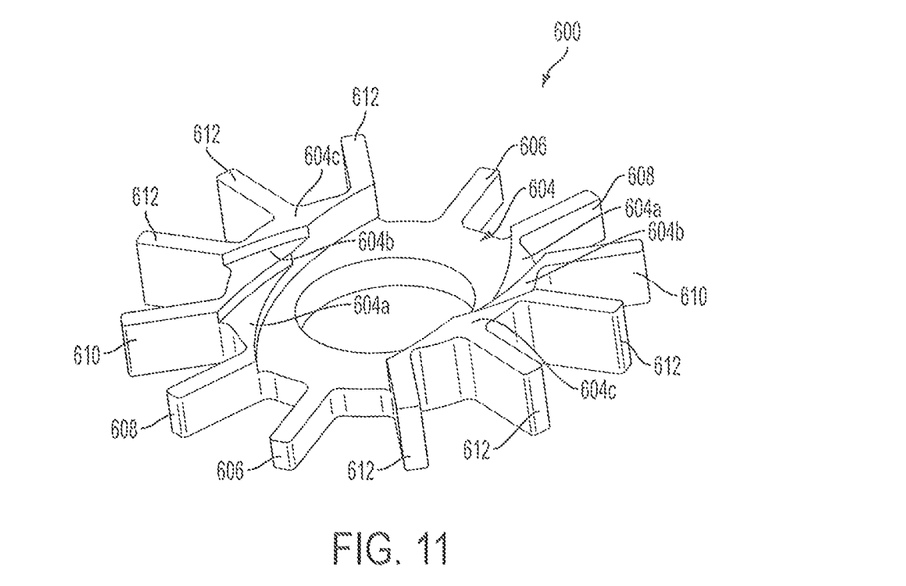
FIG. 11 illustrates a perspective view of an end insulator, according to a second embodiment of the invention.

FIG. 11 depicts an end insulator 600, according to an alternative embodiment of the invention. In this embodiment, the end insulator 600 includes a base portion 604 and several insulating teeth 606-612 extending around a circumference of the base portion 604. The insulating teeth 606-612 follow the same cross-sectional profile as corresponding peripheral teeth of the lamination stack. A bottom surface of the insulating teeth 306 and a bottom surface of the base portion 606-612 are arranged along a flat plane for attachment to an end portion of the armature lamination stack.

In this embodiment, unlike the embodiment of FIG. 3, the teeth 606-614 have different thicknesses around the base portion 604. Specifically, in an exemplary embodiment, end insulator 600 is provided with two insulating teeth 606 arranged opposite each other and extending from the main plane as the base portion 604. In an embodiment, both the base portion 604 and the insulating teeth 606 have a thickness of approximately 2-3 mm.

In an embodiment, the base portion 604 further includes a stepped surface 604a arranged at opposite peripheral portions of the base portion 604. Two additional insulating teeth 608 extend from the stepped surface 604a adjacent teeth 606. The thickness of the insulating teeth 608 is slightly greater than the thickness of the insulating teeth 606, and top surfaces of the insulating teeth 608 are on a second plane slightly distanced from the plane of the base portion 604.

Similarly, in an embodiment, the stepped surface 604a includes a stepped sub-surface 604b arranged at a plane farther from the bottom surface of the end insulator 300. Two insulating teeth 610 extend from the stepped sub-surface 604b adjacent teeth 608. The thickness of the insulating teeth 610 is slightly greater than the thickness of the insulating teeth 608, and top surfaces of the insulating teeth 610 are on a third plane slightly distanced from the second plane formed by the top surface of insulating teeth 608.

In an embodiment, the stepped surface 604a includes an additional stepped sub-surface 604c arranged at a plane ever farther from the bottom surface of the end insulator 300. The remaining insulating teeth 612 extend from the stepped sub-surface 604c between respective insulating teeth 610 and 606. The thickness of the insulating teeth 612 is slightly greater than the thickness of the insulating teeth 610, and top surfaces of the insulating teeth 612 are on a fourth plane slightly distanced from the third plane formed by the top surface of insulating teeth 610.

Figure 12:
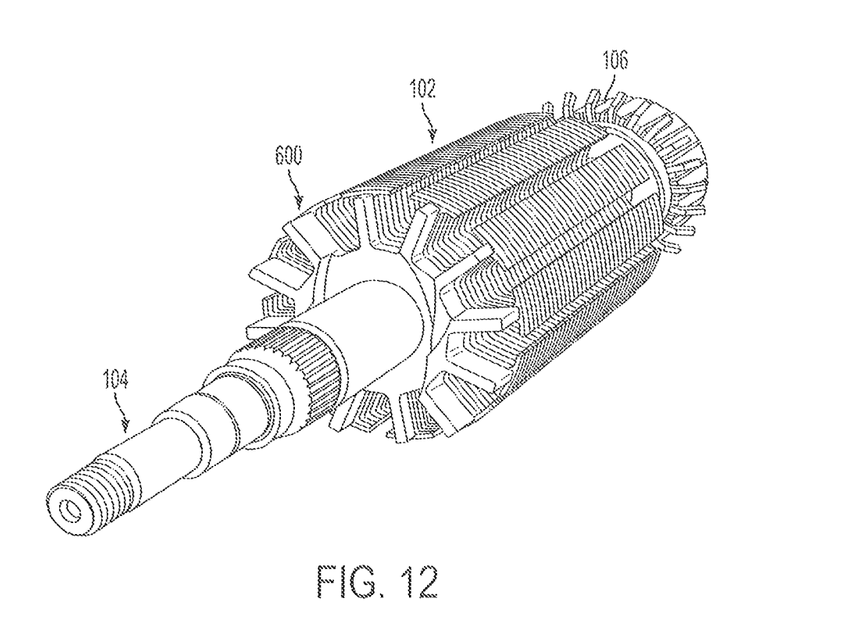
FIG. 12 illustrates a perspective view of an armature assembly including the end insulator of FIG. 11, according to an embodiment of the invention.

FIG. 12 depicts the arrangement of the end insulator 600 with respect to the armature lamination stack 102, according to an embodiment of the invention. As can be seen herein, a cross-sectional profile of the end insulator 600 matches the profile of the lamination stack. In other words, the insulating teeth 606-612 have slots formed therebetween that match the slots of the armature lamination stack 102. When attached, the slots of the end insulator 600 line up with the peripheral slots of the armature lamination stack. The end insulator 600 may be provided at one or both ends of the armature lamination stack 102.

Similarly to the end insulation of FIGS. 3-10A, the end insulation 600 of this embodiment allows the coils to be wound more compactly near the core of the armature. Specifically, in this embodiment, the coils are wound in steps, starting with the slots having low clearance, i.e., those adjacent teeth 606, followed by the slots along the first stepped surface 604a, i.e., between teeth 608 and 610, followed by slots along the second stepped surface 604b, i.e., between teeth 610 and 610, etc. In this manner, at each step the coil windings overlap the previously wound coils at the ends of the armature, which allows the coil windings to be formed closer to the armature core.

It is noted that while end insulator 600 shown herein does not include support ribs at the ends of the insulating teeth 606-612, support ribs having the same lateral profile as the ribs of the lamination slack teeth may be provided and the ends of the insulating teeth 606-612. Each support rib may be V-shaped in a longitudinal direction of the lamination stack 102, with its width narrowing as it projects away from the lamination stack 102.

Figure 13:
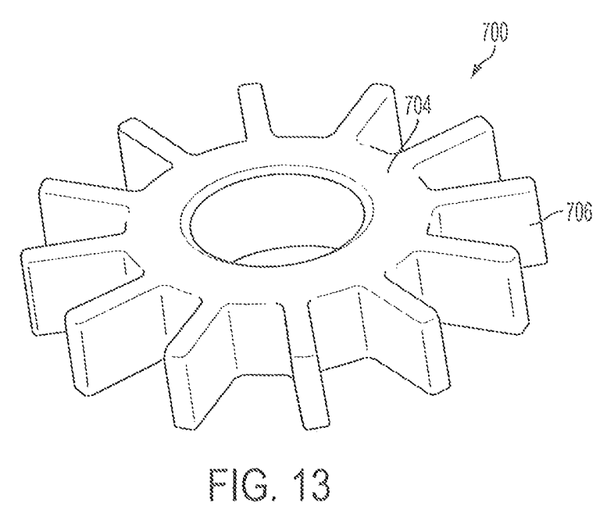
FIG. 13 illustrates a perspective view of an end insulator, according to a third embodiment of the invention.
Figure 14:
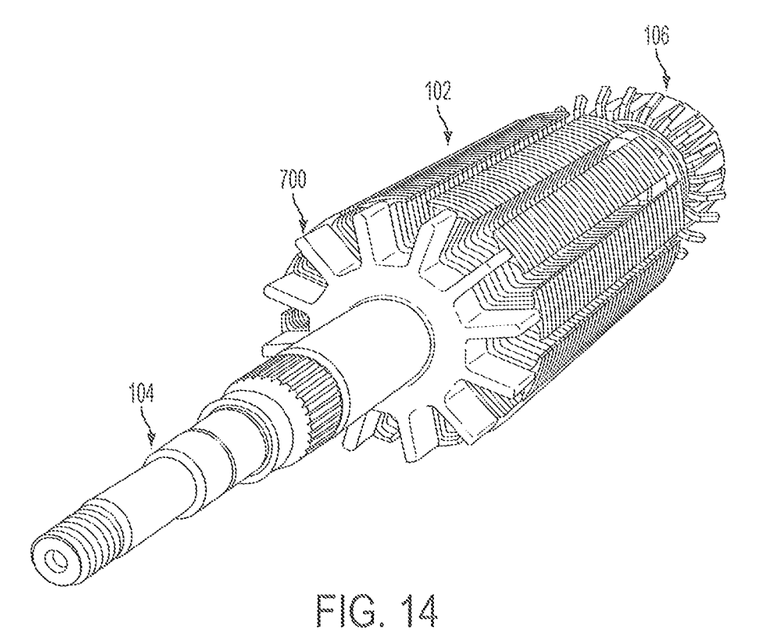
FIG. 14 illustrates a perspective view of an armature assembly including the end insulator of FIG. 13, according to an embodiment of the invention.

FIGS. 13A and 13B depict a stack insulation 700, according to yet another embodiment of the invention. In this embodiment, the stack insulation 700, including the base portion 704 and the teeth 706, are provided with a uniform thickness of at least 5 mm. It was found by the inventors that this design extends the winding turns at the ends of the lamination stack away from the lamination stack to allow more compact winding of the coils inside the lamination stack slots.

The description of the invention is merely exemplary in nature and, thus, variations that do not depart from the gist of the invention are intended to be within the scope of the invention. Such variations are not to be regarded as a departure from the scope of the invention.

The invention claimed is:

1. An electric motor comprising a stator and an armature received within the stator for rotational movement within the stator, the armature comprising:
   an armature shaft on which a commutator is mounted;
   a lamination stack also mounted on the armature shaft and having a plurality of radially extending teeth, said teeth forming a plurality of slots therebetween arranged circumferentially around a periphery of the lamination stack;
   an end insulator arranged at an end of the lamination stack, the end insulator having a base portion fitted around the armature shaft and plurality of insulating teeth corresponding to the radially extending teeth of the lamination stack, said insulating teeth forming a plurality of end insulator slots therebetween, wherein at least a portion of the insulating teeth has a greater thickness than at least a portion of the base portion, each insulating tooth comprising a first extension surface extending from an outer surface of the base portion at a first angle of 30 to 60 degrees with respect to a plane of the outer surface of the base portion, and a second extension surface extending from the first extension surface at a second angle with respect to the plane of the outer surface of the base portion that is smaller than the first angle; and
   a plurality of coils wound in said lamination stack slots and said end insulator slots.

2. The electric motor of claim 1, wherein the end insulator comprises an inner substantially flat surface mounted on the end of the lamination stack and an outer uneven surface formed by a flat surface of the base portion and at least one sloped surface of the insulating teeth.

3. The electric motor of claim 2, wherein each insulating tooth comprises two walls extending longitudinally and substantially in parallel from the inner surface of the end insulator to the outer surface thereof, said walls defining said plurality of slots of the end insulator.

4. The electric motor of claim 2, wherein each insulating tooth further includes a support rib corresponding to ribs at the ends of radially extending teeth of the lamination stack, the insulating teeth extending from the inner surface of the end insulator to the outer surface thereof.

5. The electric motor of claim 1, wherein the second angle is 0 to 10 degrees with respect to the plane of the outer surface of the base portion.

6. The electric motor of claim 1, wherein the base portion has a thickness of approximately 1-3 mm and the insulating teeth have various thickness levels between approximately 2 to 5 mm.

* * * * *